United States Patent [19]

Manzke et al.

[11] Patent Number: 5,402,296
[45] Date of Patent: Mar. 28, 1995

[54] TAPE CASSETTE, IN PARTICULAR MAGNETIC TAPE CASSETTE, AND SUPPORT LINERS FOR THIS

[75] Inventors: Klaus Manzke, Westheim; Lothar Gliniorz, Frankenthal; Klaus Schoettle, Heidelberg; Arno Huck, Rheinau; Norbert Schaeffer, Deidesheim, all of Germany

[73] Assignee: BASF Aktiengesellschaft, Ludwigshafen, Germany

[21] Appl. No.: 154,707

[22] PCT Filed: Aug. 10, 1990

[86] PCT No.: PCT/EP90/01316
§ 371 Date: Feb. 10, 1992
§ 102(e) Date: Feb. 10, 1992

[87] PCT Pub. No.: WO91/03051
PCT Pub. Date: Mar. 7, 1991

Related U.S. Application Data

[63] Continuation of Ser. No. 834,290, Feb. 10, 1992, abandoned.

[30] Foreign Application Priority Data

Aug. 12, 1989 [DE] Germany ............... 8909704 [U]

[51] Int. Cl.6 ............................................... G11B 23/02
[52] U.S. Cl. ................................. 360/132; 242/345.2
[58] Field of Search ............. 360/132; 242/199, 345.2, 242/345.3

[56] References Cited

U.S. PATENT DOCUMENTS

| | | | |
|---|---|---|---|
| 3,942,744 | 3/1976 | Fitterer et al. | 242/199 |
| 3,977,626 | 8/1976 | Gaiser et al. | 242/345.2 |
| 4,191,984 | 3/1980 | Tsukidate et al. | 360/132 |
| 4,516,181 | 5/1985 | Shirako | 242/345.3 |
| 4,624,423 | 11/1986 | Schoettle et al. | 242/345.2 |
| 4,632,334 | 12/1986 | Schaeffer et al. | 360/132 X |
| 4,681,280 | 7/1987 | Duurland et al. | 242/199 |
| 4,709,290 | 11/1987 | Schoettle et al. | 360/132 |
| 4,881,146 | 11/1989 | Bordignon | 242/199 X |
| 4,882,645 | 11/1989 | Bordignon | 360/132 |

FOREIGN PATENT DOCUMENTS

| | | |
|---|---|---|
| 8909704 | 1/1990 | Germany . |
| 2000104 | 1/1979 | United Kingdom . |
| 2047200 | 11/1980 | United Kingdom . |
| 2211818 | 7/1989 | United Kingdom . |
| 1693636 | 7/1989 | U.S.S.R. ............ 360/132 |

Primary Examiner—John H. Wolff
Attorney, Agent, or Firm—Keil & Weinkauf

[57] ABSTRACT

A tape cassette is provided with curved/bent support liners, the longitudinal bends having different cross-sectional shapes and lengths and hence different effective spring constants. The hubs or reels and, if necessary, the tape rolls are guided and the tape sections to be wound-/unwound are aligned.

11 Claims, 6 Drawing Sheets

TAPE CASSETTE, IN PARTICULAR MAGNETIC TAPE CASSETTE, AND SUPPORT LINERS FOR THIS

This application is a continuation of application Ser. No. 07/834,290, filed on Feb. 10, 1992, now abandoned.

The present invention relates to a tape cassette, in particular a magnetic tape cassette, having a housing, comprising bottom and lid walls and housing back and front, and having at least one tape roll on an essentially flangeless hub onto which and/or from which a tape can be wound or unwound, support liners having curved or bent support liner regions which are coordinated with one another and are opposite one another in relation to the central plane of the cassette and exert spring force on the tape roll or rolls being provided between the tape roll having tape windings and the bottom and lid walls of the cassette, and the support liners having, in the central region, longitudinal bends which on the one hand are partially supported on the bottom or lid surfaces and have bend parts which point toward the tape roll and exert spring forces at least on the hub and/or tape roll, and suitably formed support liners for such tape cassettes.

Flat support liners having rigidly constrained longitudinal beads, with bead heights of from 0.28 to 0.53 mm for compact cassettes having an axial free space of about one (1 mm) to about one point two millimeters (1.2 mm), are disclosed, for example in German Patent 2,825,457. The longitudinal beads of the support liners are intended to face the tape rolls and hubs. If the bead heights are at the lower limit of the abovementioned height range (e.g. 0.2–0.3 mm), the support liners act like rigid support sheets between the tape roll and the housing walls since there is no springiness. In its height, the tape roll therefore attempts to occupy the full axial free space available between the support liners which rest against the housing walls. If the bead heights are at the upper limit of the abovementioned range (e.g. 0.4–0.5 mm), the torque of the cassette increases, leading very easily to difficult running of the cassette or to jamming of the tape roll or rolls in the housing.

German Utility Model 8,606,119 furthermore discloses two-bend support liners for compact cassettes, whose longitudinal bend edges face the tape rolls and whose longitudinal support liner edges, which are bent upward or downward with respect to the central plane of the liner, are supported on the inside of the lid wall or the bottom wall of the cassette. The support liners are thus held by means of spring forces between the housing and the tape rolls. The spring characteristic is relatively flat and linear, giving a small spring constant. If the weight of the full tape roll presses on one of the support liners, there is contact between the tape roll and the support liner over a large area, the springiness of the support liner being insufficient to keep the tape roll a distance away from the support liner or from the housing wall. During playback of the cassette in the recorder, the contact over a large area produces electrostatic charges between the support liner, the cassette housing and the magnetic tape, in particular if the magnetic tape has high surface resistance, with the result that the torque of the cassette increases considerably and finally even blocks the cassette.

It is an object of the present invention to equip a cassette with support liners which ensure reliable tape roll and tape guidance, in particular in the tape run-in and run-out region on the tape roll, in combination with the permissible torque, and to provide suitable support liners themselves.

We have found that this object is achieved by a tape cassette, in particular a magnetic tape cassette, having a housing, comprising bottom and lid walls and housing back and front, and having at least one tape roll on an essentially flangeless hub onto which and/or from which a tape can be wound or unwound, support liners having curved or bent liner regions which are coordinated with one another and are opposite one another in relation to the central plane of the cassette and exert spring force on the tape roll or rolls being provided between the tape roll having tape windings and the bottom and lid walls of the cassette, and the support liners having, in the central region, longitudinal bends which on the one hand are partially supported on the bottom or lid surfaces and have bend parts which point toward the tape roll and exert spring forces at least on the hub and/or tape roll, if the longitudinal bends are formed with different cross-sectional shapes in order to exert spring forces of different magnitudes on the one or more hubs and/or tape rolls.

We have found that this object is furthermore achieved by support liners for tape cassettes, in particular for magnetic tape cassettes, having at least one tape roll on an essentially flangeless hub, for positioning between the tape roll and the cassette bottom and lid walls, if the support liners are provided with curved or bent liner regions which are coordinated with one another and are opposite one another in relation to a central plane and which should exert a spring force in the direction of the central plane, the support liners having, as springy liner regions in their central region, longitudinal bends which are formed on the side facing away from the central plane, for supporting the said liner, and which have bend parts pointing toward the central plane, having a spring constant and being capable of exerting spring forces, the longitudinal bends being formed with different cross-sectional shapes in order to exert spring forces of different magnitudes in the direction of the central plane, and said spring forces being capable of being exerted by means of different support liner regions, distributed over the liner surface.

This makes it possible for the first time to realize good tape and tape roll guidance without the effect of the guide means being reduced or eliminated in practice by electrostatic forces which are generally present.

Longitudinal bends are understood as meaning in general a curved or bent support liner region which extends in the longitudinal direction of the support liner (for example of a support liner in a compact cassette).

In a practical embodiment, the longitudinal bends may have different cross-sectional shapes along their longitudinal dimension. For example, it may be advantageous to provide the longitudinal bends, in their central region and in their end regions, with different cross-sectional shapes for great or lower spring forces.

This makes it possible to exert, in a controlled manner, predetermined spring forces on tape, tape roll and hub regions in the cassette.

The longitudinal bends may advantageously be arranged inside or just outside the hub diameter.

This results in good guidance and alignment of the empty hub too, and, with longitudinal bends present just outside the hub diameter, a guidance and alignment effect for the first tape windings to be wound onto the hub is additionally achieved.

In a tape cassette having two coplanar tape rolls, in which a longitudinal central axis connects the centers of the hubs to one another, a first longitudinal bend having a relatively great spring force can be provided in the support liner, advantageously between the longitudinal central axis and the housing back, the said longitudinal bend being continuous as far as the narrow sides of the support liner.

At the back of the cassette, which side is particularly susceptible to tape folding, this results in relatively rigidly sprung tape roll guidance and support without large contact areas between tape roll and support liners being necessary for this purpose.

In a further embodiment, a part of a second longitudinal bend, which part is shorter than the first longitudinal bend and extends in length at least from one hub to the other but not as far as the narrow sides of the support liner, can be formed in the cassette having the coplanar tape rolls between the longitudinal central axis of the cassette and the housing front.

This advantageously results in a relatively rigid spring force being exerted at least close to the hubs and in such a spring force acts on the hubs roughly symmetrically with respect to the central longitudinal axis of the cassette, so that the hubs are spring-mounted in a relatively horizontal position in a predetermined plane between the housing walls.

In a practical embodiment of the novel tape cassette, the first longer longitudinal bend and/or the shorter part of the second longitudinal bend are each formed by a double bend, one bend edge being oriented for support on the bottom or lid walls and the other bend edge pointing toward the tape roll.

Alternatively, the first longer longitudinal bend and the shorter part of the second longitudinal bend may each be formed by a relatively narrow bead or embossing having a relatively great spring force.

With this practical embodiment, it is likewise possible to realize the essential advantages of the invention if a spring characteristic of the support liner having longitudinal beads is met and maintained.

It is furthermore advantageous if the shorter part of the second longitudinal bend is provided at each end with a run-in/run-out bend part for the tape to be wound or unwound, respectively, which run-in/run-out bend part continues the second longitudinal bend as far as the outer edge of the support liner and has a spring force which is smaller than that of the shorter second longitudinal bend. Consequently, by means of a softer spring force of the bend part, the tape section running in or running out is not changed in its vertical position and form, for example through an oblique positioning or twisting, but is still supported and oriented in its vertical position and form. Furthermore, run-in furrows in the support liner during spooling of the tape during cassette production are avoided.

In a further embodiment, a longitudinal bend which extends from one hub to the other, has a relatively great spring force, is provided at each end with a run-in/run-out bend part for the tape to be wound or unwound and extends as far as the outer edge of the support liner is provided both between the longitudinal central axis of the cassette and the housing back and between the longitudinal central axis and the housing front.

This provides a support liner embodiment which is completely symmetrical with respect to the central longitudinal axis and which, if it is rectangular or symmetrical with respect to its longitudinal central axis, as shown in the drawing, permits simplification of support liner production and of the insertion of the support liners into the cassette.

In a practical embodiment, the run-in/run-out bend parts may continue the longitudinal bend essentially in a straight line as far as the support liner ends.

With essentially the same advantages, the run-in/run-out bend parts may also make an angle with the shorter part of the longitudinal bend, in particular in the direction of a corner of the support liner.

In practice, the run-in/run-out bend parts may each be formed by a single bend having a relatively small spring force, the single bend edge facing the tape section running in or running out.

Support of the vertical position and form is thus advantageously achieved in practice, although the production of the single bend is very simple.

In a further practical embodiment, the run-in/run-out bend parts may also each be formed by a relatively broad bead or embossing having a relatively small spring force, the maximum projection of which in each case faces the tape section running in or running out.

In a further practical embodiment, the ratio of the spring force of the longitudinal bend coordinated with the hub and/or tape roll to the spring force of the longitudinal bend coordinated with the run-in/run-out region of the tape may be from 3:2 to 4:1, in particular from 4:1 to 5:2, preferably about 3:1.

It is thus possible to select suitable support liners having preadjustable spring forces, depending on the thickness and transverse rigidity of the particular cassette tape.

A support liner consisting of a polyester, in particular polyterephthalate, and having a thickness of 50 $\mu$m may in practice have a double bend where the distance between the bend lines is from about 1.5 to 4 mm, in particular from about 2 to 3 mm, preferably about 2.4 mm. This makes it possible to achieve advantageous spring forces for the purposes of the present invention.

The above discussions and embodiments can essentially be extrapolated to the support liners themselves, in particular a pair of support liners. Details are to be found in the claims relating to the support liners.

Details of the present invention are described with reference to embodiments shown in the drawings.

Figure 1:
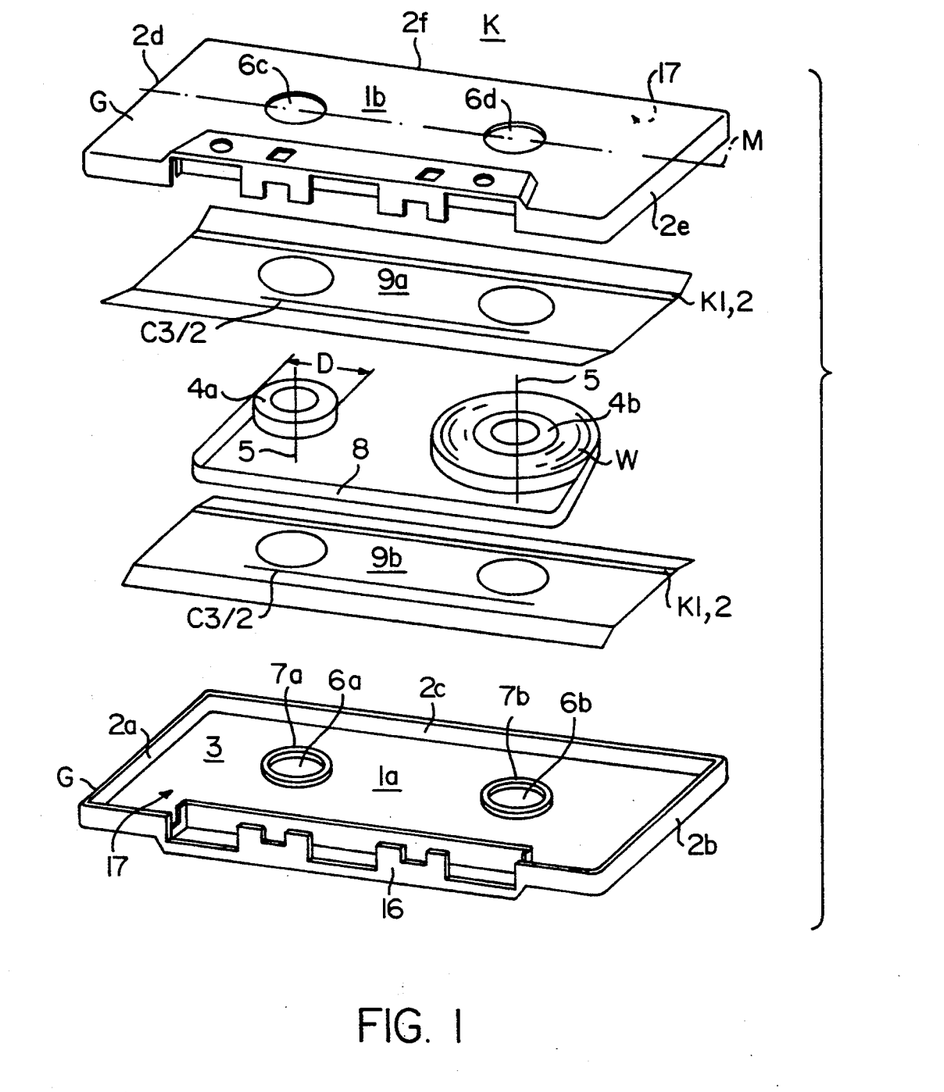
FIG. 1 shows an exploded view of a novel cassette.

FIG. 1 shows a compact cassette K having a housing G, consisting of two rectangular bottom and lid walls 1a and 1b and side walls 2a, 2b and 2c or 2d, 2e and 2f, which, when assembled, form an essentially right parallelepiped cavity 3 for holding the two hubs 4a and 4b which are rotatably mounted around axes 5 at right angles to the main walls 1a, 1b and bearing edges 7a and 7b (associated upper bearing edges are not shown) which point inward and surround orifices 6a or 6c and 6b or 6d coaxial with the said axes. A magnetic tape 8 can be wound between the hubs 4a and 4b, and the said tape is fastened to both hubs 4a and 4b at its ends, and the tape roll W, present on hub 4b in the drawing, can be wound completely or partly onto the hub 4a, after which the winding process can take place in the opposite direction.

A glide sheet 9a or 9b rests on the inside of each of the bottom and lid walls 1a and 1b in such a way that by means of longitudinal, narrow, parallel, curved or bent sheet regions, referred to above as longitudinal bends, exert a spring force against the end faces of the hubs 4a and 4b, against the tape roll W and against the magnetic tape 8 itself.

In all individual views of the support liner, the longitudinal central axis is denoted by MF.

Figure 2:
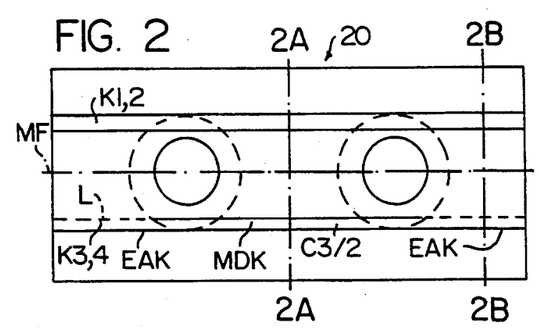
FIG. 2 shows the support liner embodiment from FIG. 1 having three and a half bends.
Figure 2A:
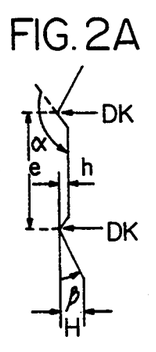
Figure 2B:
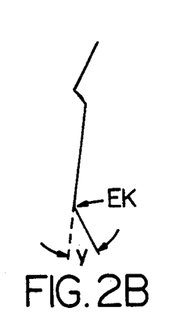

The (first) longitudinal bend K 1,2, which is the rear one relative to the front 1b of the cassette, is continuous as far as the support liner ends and is in the form of a double bend, cf. for example a cross-sectional view (A—A', B—B') in FIG. 2. The front (second) longitudinal bend is denoted by C 3/2 since it is a one and a half bend.

Here, the longitudinal bends K 1,2 and C 3/2 are in the form of parallel bends whose distance from the cassette central axis M (which corresponds to the longitudinal central axis) is constant and is chosen so that the longitudinal bends K 1,2 and C 3/2 in guiding contact with the tape 8 and/or the hubs 4a, 4b and/or the tape rolls W, are just outside the external diameter D of the hub 4, so that inward-pointing take-up bevels are in unidimensional contact with the outer upper or lower annular edges of the empty hub 4, while an outward-pointing take-up bevel faces the approaching tape windings to be wound and ensures that they are aligned and guided to the hub.

The minimum distance d between the longitudinal bends K 1,2 and C 2/3 in the immediate proximity of the associated hub 4 essentially corresponds to the width b of the tape 8 or is slightly smaller (d≦b), as indicated in FIG. 8.

In FIG. 2, the cross-sectional views A—A' and B—B', the shape of the double bends DK of the support liner 20 and the shape of the single bend EK of the run-in/run-out parts EAK are recognizable. The bend angles $\alpha$ [in the case of double bend DK] and $\gamma$ [in the case of single bend EK], which determine the bend heights and, in conjunction with the material and the thickness of the support liner, the spring characteristic of the liner, are each designed according to cassette type and magnetic tape characteristics. In a practical example of a BASF Chrom Maxima II compact cassette, for polyester support liners 0.050 mm thick bend heights h of from 0.2 to 0.5 mm and H of from 1 to 2 mm were used, with a bend spacing 1 of, preferably, 2.4 mm, which can generally be chosen in the ranges from about 1.5 to 4 mm, in particular from about 2 to 3 mm.

The longitudinal bend C 3/2 in FIG. 2 has a shorter part or central part MDK which is shorter than the continuous longitudinal bend K 1,2 but otherwise essentially has the same dimensions with a shorter length, extending roughly tangentially from hub 4a to 4b.

Extrapolation lines L indicate the course of two continuous longitudinal bends K 1,2 in the form of double bends, with which embodiment a comparison will subsequently be made in the graph in FIG. 10. The cross-section B—B' does not of course correspond to the DK version; cross-section A—A' is applicable to this.

Figure 3:
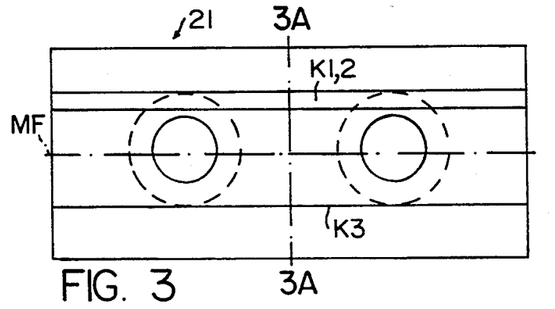
FIG. 3 shows a support liner embodiment having 2 different longitudinal bends(3-bend support liners)
Figure 3A:
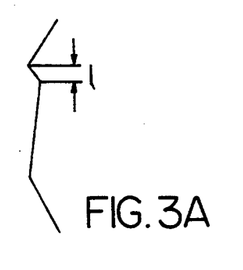

FIG. 3 shows an embodiment of a support liner 21 having two longitudinal bends K 1,2 and K 3, K 1,2 being a double bend (DK) as in FIG. 2 and K 3 being a continuous single bend EK, as is clearly recognizable in cross-section A—A'. Since the spring force of EK is substantially lower than that of DK (cf. FIG. 10), it is also evident that the hubs 4 and tape rolls W are forced to adopt an asymmetry, virtually an oblique position with respect to the housing walls 17, and such cassettes tend to experience higher torque, although the run-in/run-out characteristic of the tape section is substantially better than that of commercial cassettes.

Figure 4:
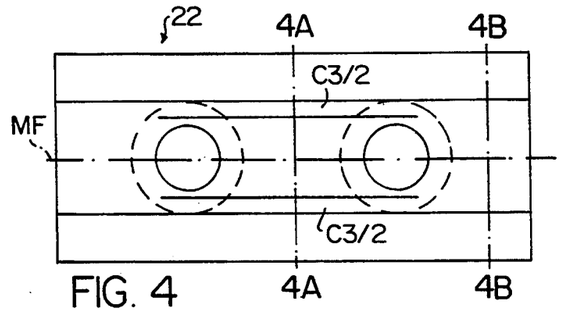
FIG. 4 shows a symmetrical support liner embodiment having two sets of one and a half bends.
Figure 4A:
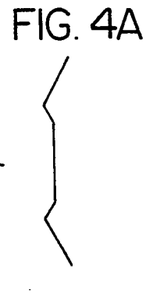
Figure 4B:
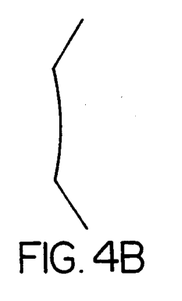

FIG. 4 shows doubly symmetrically arranged C 3/2 longitudinal bends on a support liner 22, which have advantages with regard to production and the choice of position of insertion (front and back of cassette) during assembly.

Figure 5:
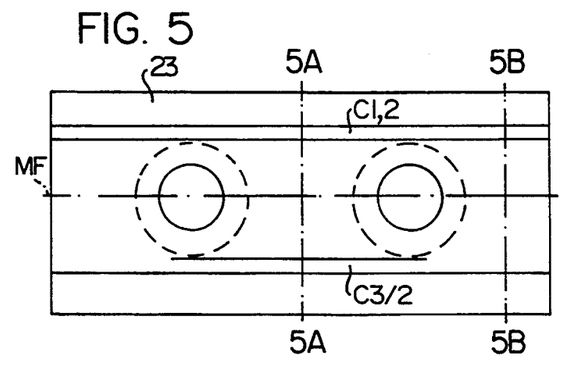
FIG. 5 shows a support liner embodiment having three and a half bends, FIG. 6 and 7 each show a further support liner embodiment having three and a half bends.
Figure 5A:
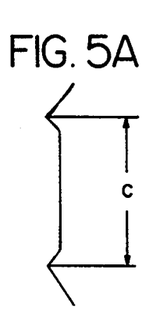
Figure 5B:
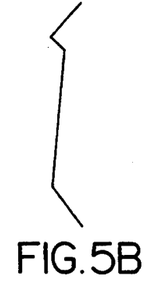

It is possible that, in the left or right upper fourth of the tape roll, guidance is not quite as good as in the case of the support liner embodiments 20 and 23 of FIGS. 2 and 5. FIG. 5 shows the support liner 23 which merely has a distance c between DK C 1,2 and the combination bend C 3/2 which is slightly larger than the distance e in FIG. 2 (e<c). This results in a smaller degree of guidance, particularly of the empty hub.

Figures 6, 6A, 6B:
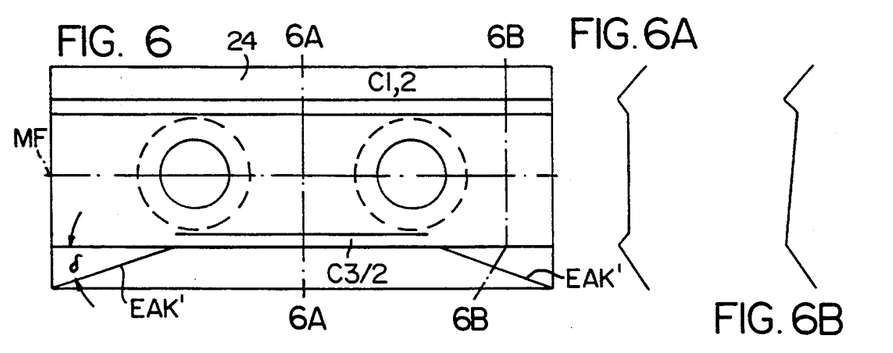

Support liner 24 in FIG. 6 differs merely through two run-in/run-out bends EAK' inclined to the outer liner edge, but this does not alter the function of the support liner 24 compared to that of support liner 20.

Figure 7:
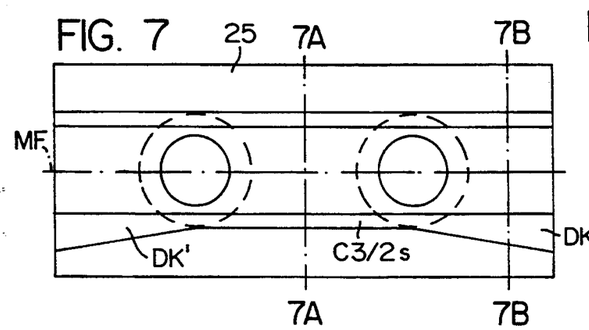

Support liner 25 in FIG. 7 has run-in/run-out bends (EAK) which taper outward in a delta shape but one [sic] are in the form of more broadly tapering double bends or corresponding beads DK'. The central part (MDK) of the longitudinal bend C 3/2s can in the latter case also be in the form of a bead or embossing.

Figures 7A, 7B:
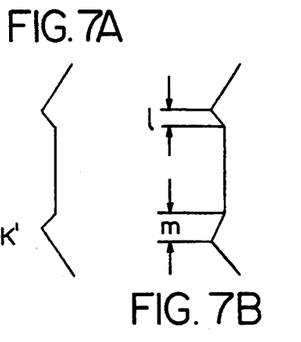
FIG. 7A shows the support liner embodiment from FIG. 7 as a pair, along the central cross-section A—A'.
Figure 7C:
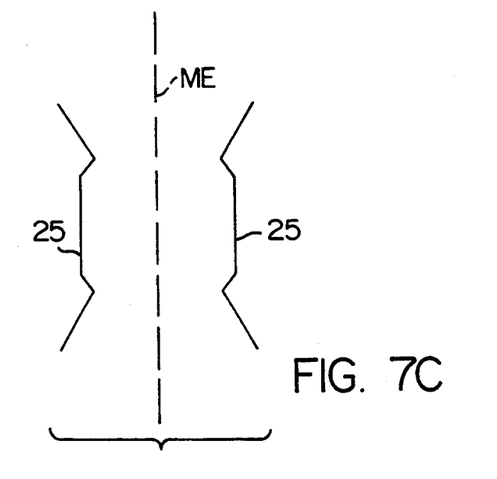

FIG. 7A shows the central cross-sectional view A—A' of a pair 25 of support liners after installation, and the reference central plane ME which, in the tape cassette, represents the central plane of the cassette interior or the central position of the tape roll.

Figures 8A, 8B:
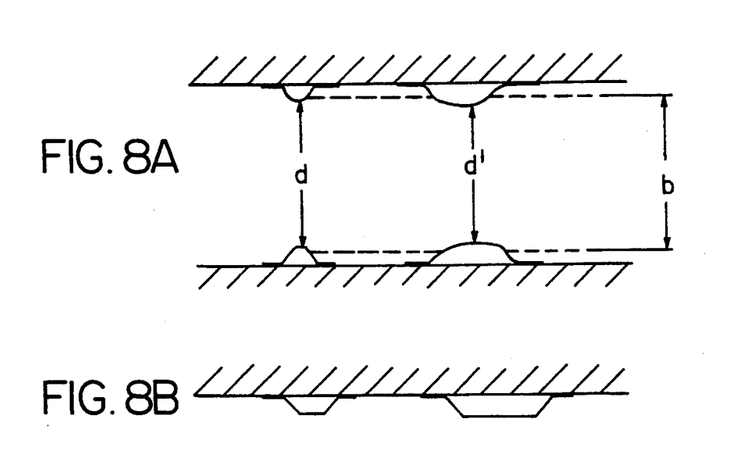
FIG. 8 shows schematic cross-sectional pairs.
Figure 8C:
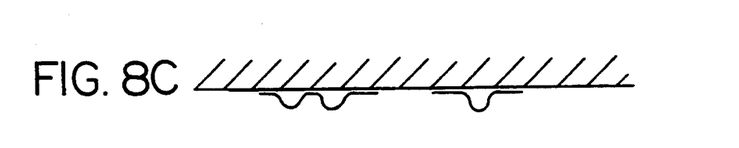

Various embossing or bead combinations having a greater spring force on the left and a smaller one on the right are shown in FIG. 8. FIG. 8a) shows a circular bead or embossing FIG. 8b) shows a trapezoidal bead or embossing FIG. 8c) shows a double bead or embossing in combination with a single bead or embossing.

Other cross-sectional shapes which have the same effect can also be used.

Figure 9:
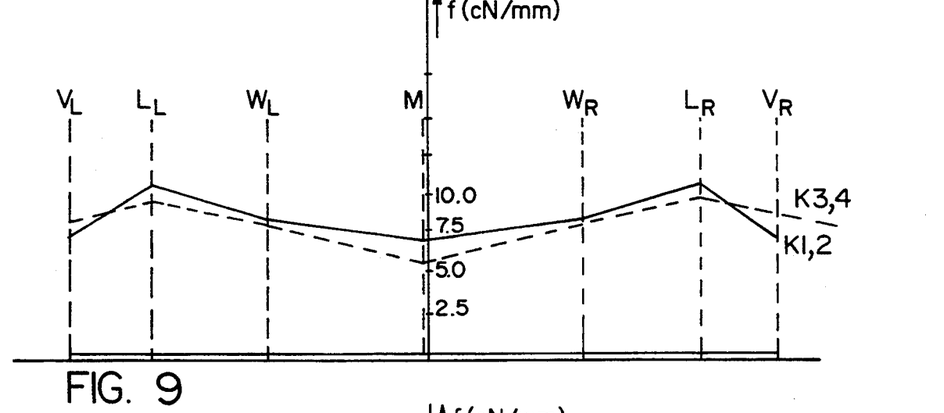
FIG. 9 presents a graph showing the spring constant of the support liner as a function of the position in the cassette, using a double-bend support liner as an example.

For the continuous longitudinal bends K 1,2 and K 3,4 with extrapolations L) of the double-bend support liner in FIG. 1, FIG. 9 shows the particular spring constant at different places in the DK support liner 20 in cassette K.

The measuring positions are as follows:

V Run-in region of the tape in the case of the empty tape roll

L Run-in region of the tape in the case of the full tape roll
W Hub center
M Cassette center The spring force is measured in each case along the longitudinal bend, for the same, vertical spring travel of 0.4 mm.

The indices L and R denote left and right. FIG. 9 shows that high spring forces were measured acting from the outside inward, viewed along the longitudinal direction of the compact cassette.

Figure 10:
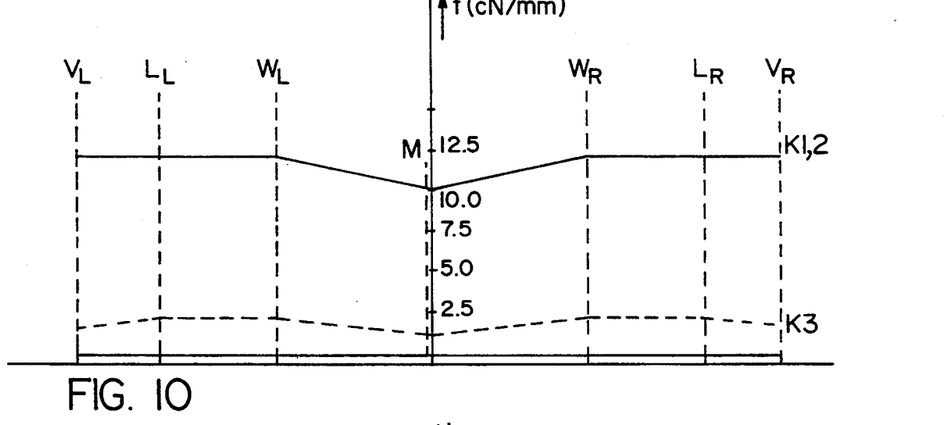
FIG. 10 shows a graph according to FIG. 9 but for the three-bend support liner from FIG. 3.

FIG. 10 shows very different spring forces, the longitudinal bend (EK) K3 exerting only about 1/10 of the spring forces of the longitudinal bend K 1,2, so that the roll may adopt an inclined position.

Figure 11:
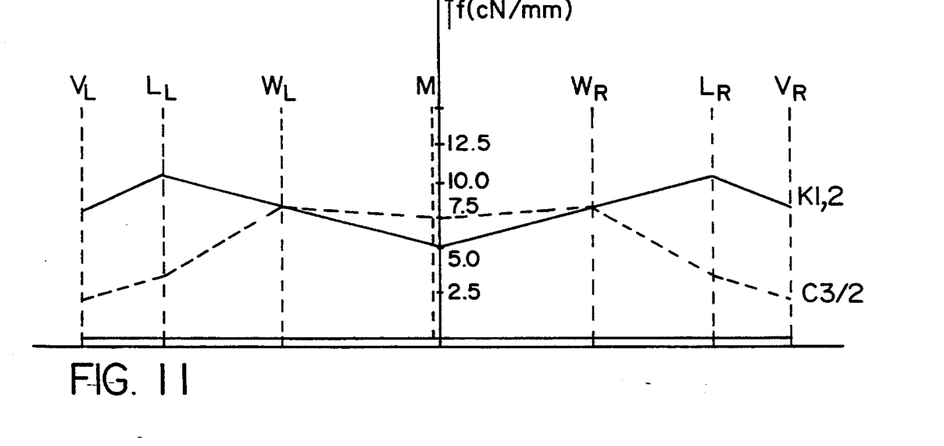
FIG. 11 shows a graph according to FIG. 9 but for the three and a half bend support liner from FIG. 2 or 5.

Finally, FIG. 11 shows the result for the C 3/2 longitudinal-bend support liner 20 (without the extrapolations L) or 25, only about one third of the spring forces occurring in the run-in/run-out region ($V_L$, $V_R$) compared with those in the case of longitudinal bend K 1,2, so that the tape is wound and unwound without problems, the hubs and tape rolls are kept in the required position and electrostatic charges are substantially avoided owing to the small contact surfaces between support liners and tape/tape rolls.

The dimensions of the individual parts of the tape cassette and support liners according to the invention are stated below for the example of a compact cassette (CC) according to DIN 45,516 (June 1976):

| BASF Chrom Maxima II Compact Cassette | |
|---|---|
| Width of magnetic tape 8 | b = 3.81 mm |
| Axial width of the hubs 4 | Ba = 3.9 to 4.1 mm (dia. 4.0 mm) |
| Axial height of the cassette cavity 3 | Wa = 5.0 to 5.2 mm (dia. 5.1 mm) |
| Thickness of the glide sheets 9, 20 to 25 | 50 μm |
| Height of the bend edges of the support liners | h = 0.2 to 0.5 mm |
| Height of the side parts of the support liners | H = 1 to 2 mm |
| Bend spacing | l = 2.4 mm |

(Ranges of the bend spacing from about 1.5 to 4 mm, in particular from about 2 to 3 mm)

To compare the invention to the prior art, a type UCX-S 90 compact cassette (CC) from Sony, Japan (CC A) is compared with a compact cassette of type Chrom Maxima ® II from BASF AG (CC B) under otherwise identical measurement conditions. The CC from Sony corresponds to the cassette described in German Patent 2,825,457, the longitudinal embossings of the support liners having in practice a height h of 0.3 mm and a width (spacing of the bend edges of about 2.6 mm), so that the flat support liners were arranged relatively loosely between inner surfaces of the housing and tape roll, although the embossings had a rigid spring characteristic.
® is registered trade mark of BASF AG, Ludwigshafen The height range of from 0.28 to 0.53 mm stated in German Patent 2,825,457 for the embossings is adjusted by placing film strips underneath in the central region of the cassette (CC A), as in the BASF (CC B) cassette, in which the downward- and upward-pointing, curved or bent support liner regions had a total height of 0.8 mm, i.e. were supported under spring load on the hub and tape roll. The thicknesses of the support liners were the same in both CCs. The material was polyterephthalate.

In both cases of torque measurement and wow and flutter measurement, the difference between the theoretical distance d (between embossings or bend edges (cf. FIG. 8) and the tape width b was defined as the abscissa and was varied. The value 0 (zero) thus means that d=b, i.e. that there is no longer any free space between the tape roll and the inner surface of the housing.

Description of the measurements.

In the torque measurement, the winding torque during rewinding of a CC is measured without contact between the head and the tape. The take-up spindle is braked with a constant torque of 8 cNcm. The take-up side has an almost full roll and the unwind side an almost empty roll. The measurement was made shortly before the end of the tape run. The CC is horizontal during the measurement. The speed of the take-up spindle is 500 rpm (revolutions per minute). The measuring apparatus is a torque meter (constructed by BASF AG, Ludwigshafen) and is based on the measurement of the increase in the current of the take-up motor.

The wow and flutter measurement is a measurement of the fluctuation in the audio output of a CC during playback of a recorded signal of frequency 3150 Hz on two different commercial single-capstan recorders, each having 2 heads. The wow and flutter meter from Woelke, 8069 Schweitenkirchen measures the resulting frequency fluctuations unweighted with a demodulator bandwidth of 1000 Hz. The ten largest difference values from many measurements are used, and the mean value is calculated using an HP 85 B computer (from Hewlett & Packard). All measured values are presented in a frequency distribution and recorded over the entire tape length.

The curves A are the measured curves of the compact cassette UCX-S 90 (Sony) and the curves B are those of the BASF compact cassette according to the invention.

The solid curves show the measured values of the compact cassette unchanged with regard to the tape bracket, whereas the dashed curves illustrate a tape bracket displacement of 0.1 mm with respect to the plane of the hub.

| Results of the measurements of CC A (Sony) | | | | |
|---|---|---|---|---|
| Δ (d-b) [mm] | 0.1 | 0.15 | 0.20 | |
| Md [Mcm] | 0.20 (44%) | 0.29 (64%) | 0.45 (100%) | nbd |
| | 0.20 (40%) | 0.28 (56%) | 0.4 (80%) | wbd |
| W + F [%] | 0.085 (11.4%) | 0.175 (30.4%) | 0.425 (73.9%) | nbd |
| | 0.33 (51.5%) | 0.40 (62.5%) | 0.44 (68.8%) | wbd | nbd = no bracket displacement
wbd = with bracket displacement (In the Table below, too, the percentages are based in each case on the initial value:
In the case of A, on the particular value at d-B [sic]=0.15
In the case of B, on the particular value at d-b=0.)

The result is that the increase in torque rises from 44% to 100%, even without bracket displacement, and the wow and flutter noises increase by about 11% to about 74% without bracket displacement and increase very substantially by 51.5% to about 69% with bracket displacement.

Purely from the mechanical properties, the prior art CC is not suitable for trouble-free operation on all commercial recorders and causes a deterioration in the electroacoustic playback by a half to two thirds if the tape bracket projects by only 0.1 mm, which is a frequent occurrence in production technology.

| Results of the measurements of CC B (BASF) | | | |
|---|---|---|---|
| Δ (d-b) [mm] | 0.1 | 0.15 | 0.20 |
| Md [Mcm] | 0 | 0 | 0.01 | nbd |
| | 0.03 (6.7%) | 0.035 (7.7%) | 0.04 (8.9%) | wbd |
| W + F | 0 | 0 | 0 | nbd |
| | 0.025 (4.2%) | 0.0375 (6.25%) | 0.04 (6.7%) | wbd | nbd = no bracket displacement
wbd = with bracket displacement

In this context, it is found that, despite a considerable reduction in the spring travel of the glide sheets, the torque increases only slightly by less than 9%, even with tape bracket displacement. This tolerance is easily coped with by most recorders, so that there are no mechanical disturbances during operation of the CC on the recorders.

In the case of the CC B (BASF), wow and flutter are, even with tape bracket displacement, substantially below 7%, which in view of the more difficult conditions (restriction of the spring travel plus tape bracket displacement) confirms the high level of reliability of these novel glide sheet embodiments.

The CC A, with its support liners having the longitudinal embossings described above, is not suitable for sufficiently continuous guidance of the tape roll and of the tape windings to be wound, so that this CC A led to jamming in about 10% of the number of compact cassettes tested.

The result of the present invention is that a continuous spring pressure should be present between the support liners and the tape roll or the support liners and the tape, and this spring pressure should be chosen to have different magnitudes over the area of the support liner or of the cassette.

Figure 12A:
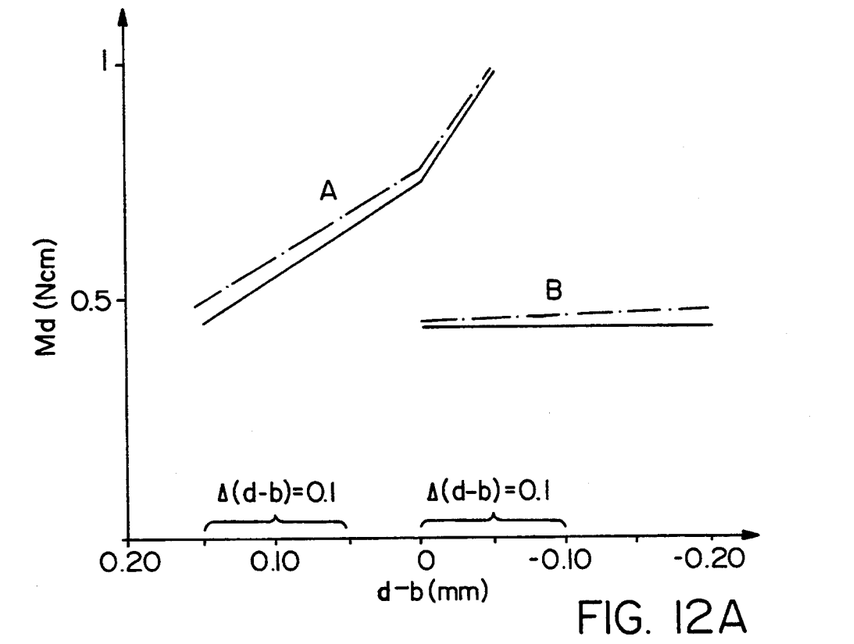
FIG. 12 shows torque and wow and flutter curves in comparison with a prior art cassette.
Figure 12B:
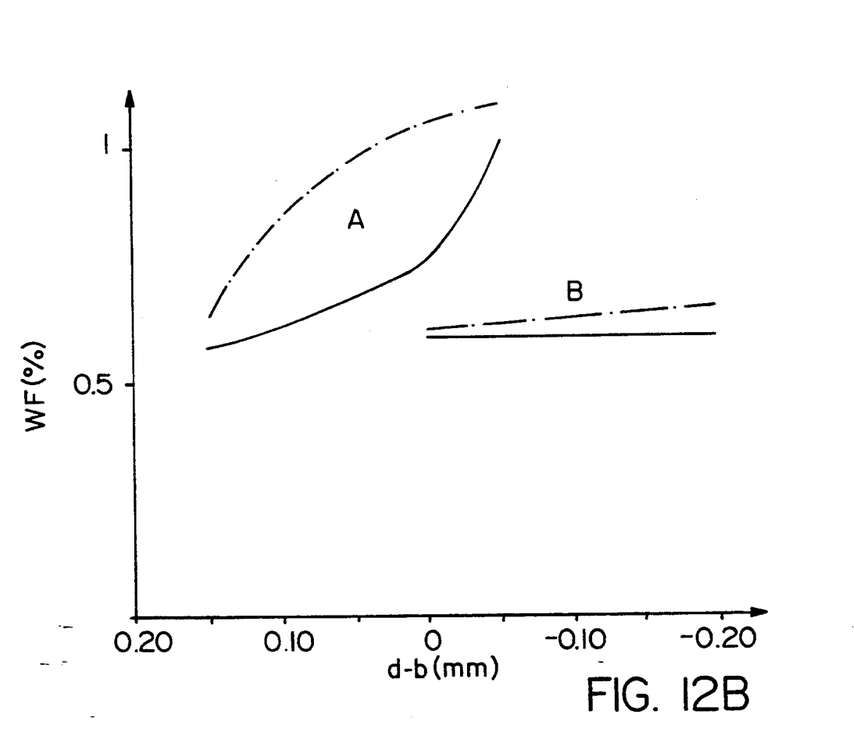

According to the above Comparative Experiments, the results of which are shown in FIG. 12, the CC A was modified on the basis of the present invention, so that there is finally constant contact between the embossings and the tape roll at d-b=0. The torque curves A clearly show that, from this operating state d-b=0, the torque Md increased with a steep gradient, which in practice rapidly leads to failure of the cassette in virtually all cases, since in this case neither winding nor recording/playback is possible. The curves B, which are measured using a support liner 20 with K 1,2 and C 3/2 longitudinal bends (i.e. a 3 κ bend support liner), show, on the other hand, only a very gentle gradient of a slightly increased torque merely in the case of hub displacement.

Regarding run-in/run-out of the tape section onto or from the tape roll 4, an inclined position and twisting of tape section running in or running out, similarly to support liner 20 having two double bends K 1,2 and K 3,4, was also observed in the case of CC A (for measured values see FIG. 9), so that in comparison the novel BASF Chrom Maxima II compact cassette having 3 ½ bend support liners) performed far better than the prior art CC A in this respect too (cf. measured values in FIG. 11 and wow and flutter measurements in FIG. 12).

In addition to the embodiments of cassettes having support liners, which embodiments have been described by way of example, and the said support liners themselves, further embodiments are of course also possible. For example, it may be advantageous further to reduce the spring travel of the support liners in places by means of housing projections (or to increase the said spring travel by means of housing recesses), so that it is also possible to achieve different spring constants in the region of hubs, tape rolls and tape.

A tape cassette is formed with support liners having curved and bent liner regions which consist of longitudinal bends having different cross-sectional shapes for spring forces of different magnitudes, and which can be used both for guiding the hub and the tape roll and for aligning and guiding the tape section to be wound and/or unwound. Practical embodiments of the longitudinal bends differ by having different cross-sectional shapes, also along one longitudinal bend, and by having different arrangements, parallel or at an angle to the longitudinal axis of the cassette.

We claim:

1. In a magnetic tape cassette having a housing containing a magnetic tape having two ends comprising a top lid wall a bottom lid wall, two side walls, a front wall and a back wall, said housing having therein two flangeless hubs, each of which has one end of the magnetic tape attached thereto, and by which the magnetic tape is transported from one hub to the other, in a direction generally along the longitudinal axis of the cassette, by the winding of the magnetic tape on one of the hubs to form a tape roll, with the simultaneous unwinding of the magnetic tape from the magnetic tape roll on the other hub, the improvement wherein the housing contains two support liners therein which are coordinated with each other and are opposite one another in relation to the horizontal central plane of the cassette, one of said liners being in contact with the inner surface of, and supported by the top lid wall, and the other being in contact with the inner surface of, and supported by, the bottom lid wall, pressure means for providing stabilizing spring force on said hubs and/or said magnetic tape rolls, said pressure means being provided by said support liners having longitudinal bends provided on either side of the central longitudinal axis of the housing, which longitudinal bends contact said hubs and/or said at least one tape roll thereby applying the stabilizing spring force, said hubs and said magnetic tape being between the two support liners such that, depending on the diameter of the tape rolls during operation of the cassette, the support liners each exert a spring force opposite to the other onto both of said hubs and/or onto at least one of said magnetic tape rolls, said bends being of a length at least sufficient to reach from the center line of one hub to the center line of the other, said longitudinal bends having the structure:

a) wherein a longitudinal bend has a continuous cross-sectional shape over its entire length with at least one adjacent bend having a different cross sectional shape, such that spring forces of different magnitudes are exerted along the horizontal plane of the housing, or b) wherein the longitudinal bends have different cross-sectional shapes over their entire length such that spring forces of different magnitudes are asserted longitudinal axes of the housing, whereby said spring forces of different magnitudes are applied onto said hubs and/or at least one of said tape rolls within the housing of the cassette.

2. A tape cassette as claimed in claim 1, wherein at least one of the longitudinal bends, having a continuous cross-sectional shape over its entire length up to the liner ends, has a relatively great spring force and is arranged between the central longitudinal axis and the rear wall of the housing.

3. A cassette as claimed in claim 2, wherein a first longitudinal bend is in the form of a double bend, and a second longitudinal bend, which is provided between the longitudinal central axis and the housing front, is essentially in the form of a single bend.

4. A cassette as claimed in claim 2, wherein a first longitudinal bend and a second longitudinal bend are each formed by a double bend, one bend edge of the double bend being oriented for support on the inner bottom or lid walls and the other bend edge of the double bend pointing toward the tape roll.

5. A cassette as claimed in claim 2, wherein the first longitudinal bend and the second longitudinal bend are each formed by one or more relatively narrow beads or embossings having a relatively great spring force.

6. A cassette as claimed in claim 2, wherein a first and a second longitudinal bends are provided and a part of a second longitudinal bend, which part is shorter than the first longitudinal bend, is formed between the longitudinal central axis of the cassette and the housing front, this part extending from one hub to the other, the shorter part of the second longitudinal bend being provided at each end with a run-in/run-out bend part for the tape to be wound or unwound, respectively, which run-in/run-out bend part continues the shorter part of the second longitudinal bend as far as the outer edge of the support liner and has a spring force which is smaller than that of the shorter part of the second longitudinal bend.

7. A cassette as claimed in claim 2, wherein a shorter part of a longitudinal bend, which shorter part extends from one hub to the other, has a relatively great spring force, is provided at each end with a run-in/run-out bend part for the tape to be wound or unwound and extends as far as the outer edge of the support liner, is provided both between the longitudinal central axis of the cassette and the housing back and between the longitudinal central axis and the front wall of the cassette.

8. A cassette as claimed in claim 1, wherein the longitudinal bends are arranged inside the diameter of the at least one hub.

9. A cassette as claimed in claim 1, wherein the longitudinal bends are arranged just outside the diameter of the at least one hub.

10. A tape cassette as claimed in claim 1, wherein a first of the longitudinal bends, having a continuous cross-sectional shape over its entire length up to the liner ends, has a relatively great spring force and is arranged between the central longitudinal axis and the housing back and a second of the longitudinal bends which is shorter than the first longitudinal bend and extends at least from one hub to the other is arranged between the central longitudinal axis and the front wall of the housing.

11. The cassette of claim 1 wherein one of the bends which is shorter than the length of the liner is provided at each end with a run-in/run-out bend part, having a lesser spring force than the bend part which it joins, which run-in/run-out bend part extends toward the front of the cassette to support the tape section running in or running out during its winding or unwinding.

* * * * *